United States Patent [19]

Atkinson et al.

[11] Patent Number: 4,796,602

[45] Date of Patent: Jan. 10, 1989

[54] MAPLE SYRUP VAPORIZER APPARATUS WITH HOLLOW SHELL RECIRCULATION ARCH

[75] Inventors: Arthur H. Atkinson, Burlington; David E. Buttolph, Fairfax, both of Vt.

[73] Assignee: Small Brothers U.S.A., Inc., Swanton, Vt.

[21] Appl. No.: 123,744

[22] Filed: Nov. 23, 1987

[51] Int. Cl.⁴ .......................... A01G 13/06; B01D 1/00
[52] U.S. Cl. .................................. 126/59.5; 159/32; 159/36; 159/38
[58] Field of Search .................. 126/60, 284, 281, 100, 126/110 R, 112, 19 R, 58, 59.5, 77, 80, 276; 99/483, 496, 495; 159/36, 38, 46, 32, 24.2, 22

[56] References Cited

U.S. PATENT DOCUMENTS

| | | | |
|---|---|---|---|
| 35,679 | 6/1862 | Hartu | 159/32 |
| 240,621 | 4/1881 | Stubbs | 159/36 |
| 268,310 | 11/1882 | Stevens | 159/32 |
| 630,174 | 8/1899 | Brand | 159/32 |
| 974,475 | 11/1910 | Daniels | 159/38 |
| 1,424,248 | 8/1922 | Jordon | 126/276 X |
| 1,524,837 | 2/1925 | Meadows | 159/32 |
| 2,851,941 | 9/1958 | Cogar | 126/59.5 X |
| 3,789,824 | 2/1974 | Mason | 126/59.5 |
| 3,967,547 | 7/1976 | Sykes et al. | 126/19 R |
| 4,474,165 | 10/1984 | Richardson | 126/19 R |

FOREIGN PATENT DOCUMENTS 2671 of 1866 United Kingdom ................ 159/36

Primary Examiner—Larry Jones
Attorney, Agent, or Firm—Sughrue, Mion, Zinn, Macpeak and Seas

[57] ABSTRACT

A hollow shell recirculation arch underlies and supports at least one maple sap vaporizing pan. The arch is formed of inner and outer sheet metal shells. The inner shell is upwardly open and is sized smaller than the outer shell so as to form a space therebetween defining a first head exchange chamber. A transverse bridge wall is interposed within the inner shell, intermediate of the inner shell front wall and a rear wall, and separating the inner shell into a fire box and a second heat exchange chamber. Fire brick lines the interior surfaces of the fire box. Preferably the transverse sidewalls of the inner shell are V-shaped to concentrate and reflect the heat upwardly through the open top of the inner shell against the vaporizing pan. A smoke stack assembly includes a horizontal smoke stack pipe fixedly mounted to the arch and projecting through the rear walls of the outer and inner shells and extending over the major length of the regenerative head exchanger section of the arch and terminates in an open end facing the bridge wall and spaced slightly therefrom. Fresh combustion air is forced through the first head exchange chamber between the inner and outer shells, flowing the length of the arch for preheating the combustion air. Passages provide a primary air stream feed into the combustion chamber along with secondary air through the bridge wall which is preferably hollow and bears a plurality of short length nozzles discharging secondary air into the fire box.

12 Claims, 6 Drawing Sheets

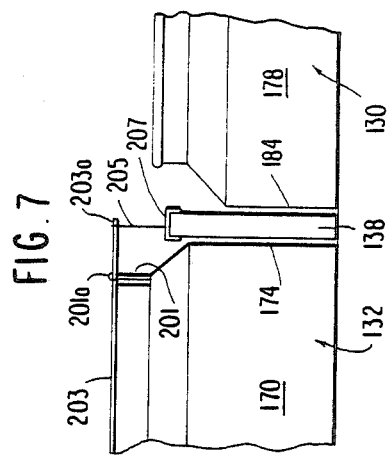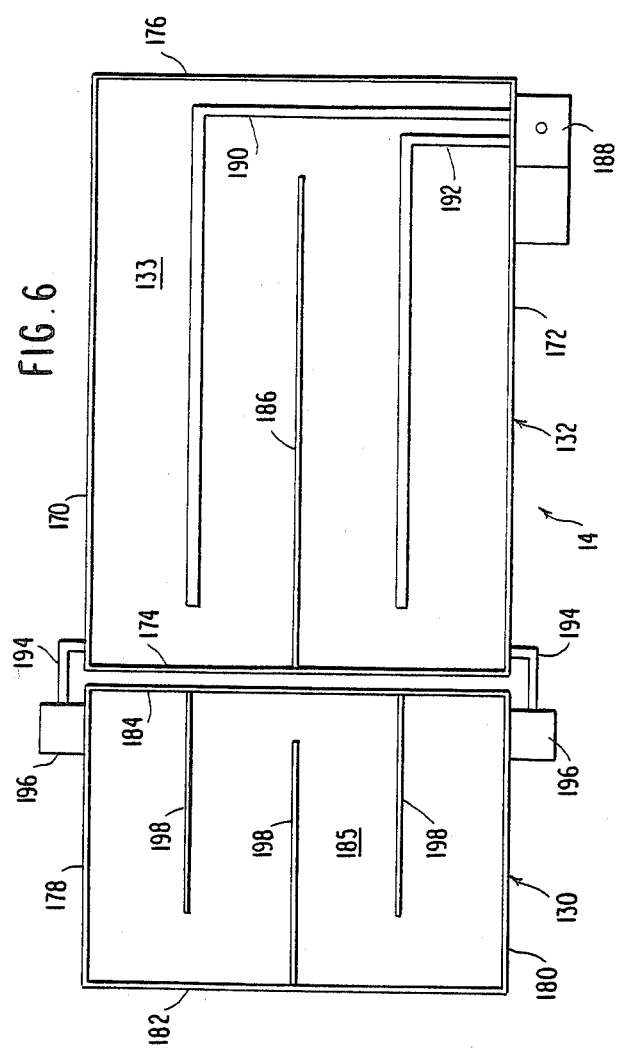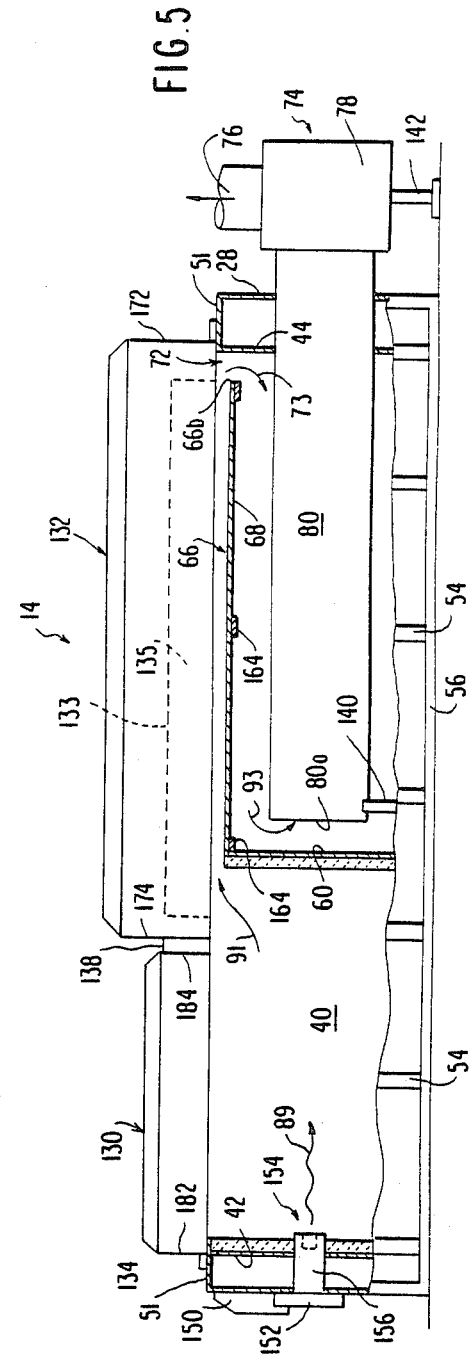

MAPLE SYRUP VAPORIZER APPARATUS WITH HOLLOW SHELL RECIRCULATION ARCH

FIELD OF THE INVENTION

This invention relates to a maple syrup vaporizer apparatus of the type in which a furnace structure underlies a series of end to end positioned vaporizing pans through which maple sap is circulated to boil off the water and concentrate the syrup and more particularly, to such apparatus which facilitates the burning of oil or wood fuel which concentrates and directs heat to the overlying vaporizing pans, which reduces the loss of waste heat, and which improves the efficiency of the vaporizer apparatus.

BACKGROUND OF THE INVENTION

Since the days of the colonists, maple syrup and sugar have been manufactured by tapping maple sap from sugar maple trees in late winter, and applying heat from an open fire or confined flame against the bottom of a vaporizer tank or tub within which the maple tree sap is placed to concentrate the sap and develop maple syrup. Typically, there is a high loss of heat resulting from the combustion of wood, coal or liquid hydrocarbon fuel, both by radiation, thermoconduction and by the heat carried within the exhaust gas which may escape through a vertical flue or chimney associated with the apparatus. Since the advent of fuel shortages such as the liquid hydrocarbon fuels, more attention has been paid to developing an effective furnace apparatus for heating the overlying vaporizing pan or pans and the concentration of developed heat from burning of the fuel, against the bottom surface of the vaporizing pan or pans and improving the combustion process to maximize the heat resulting from the combustion of a satisfactory fuel/air mixture.

In an effort to improve the overall efficiency of the maple syrup vaporizer apparatus, in the very recent years, there has been developed a piggy back type vaporizer pan assembly in which the water vapor which is boiled off the maple tree sap within the primary vaporizing pan, is condensed on a sheet metal drip pan overlying the primary vaporizing pan and which heat, in turn, is supplied by conduction to sap or syrup in the secondary vaporizing pan positioned immediately above the main vaporizing pan.

While such efforts have been helpful, there is a need for a unitary maple syrup vaporizing apparatus consisting of one or more end to end positioned vaporizing pans and an underlying furnace or arch which is purposely configured to reflect generated heat in the direction of the overlying pans, which effectively directs the combustion gases along a path in direct contact with the overlying end to position vaporizing pans, which effectively reduces the waste heat leaving with the exhaust gases by regenerative heating of the incoming fresh air employed in combustion of the fuel within the furnace section of the unitary apparatus, and in which the combustion products are forced along a reversible recirculation path prior to entering the chimney thereof.

BRIEF DESCRIPTION OF THE DRAWINGS

FIG. 4 is a perspective view of an oil fired recirculation arch portion of a maple syrup vaporizer apparatus forming a second embodiment of the invention, with the vaporizer pan assembly deleted therefrom to facilitate a better understanding of the makeup of the arch structure.

FIG. 5 is a longitudinal, vertical sectional view of the maple syrup vaporizer apparatus of FIG. 4 with the vaporizing pan assembly incorporated therein.

FIG. 6 is a top plan view of the maple syrup vaporizer apparatus of FIG. 4 showing the makeup and hydraulic connection for the main vaporizing pan and syrup concentrating pan forming principal components thereof.

FIG. 7 is a side elevational view of a portion of the vaporizing pan assembly of FIG. 6 showing the mounting of a ceramic blanket transversely between the main vaporizing pan and the syrup concentrating pan of the vaporizing apparatus of FIG. 4.

DESCRIPTION OF THE PREFERRED EMBODIMENTS

Figure 1:
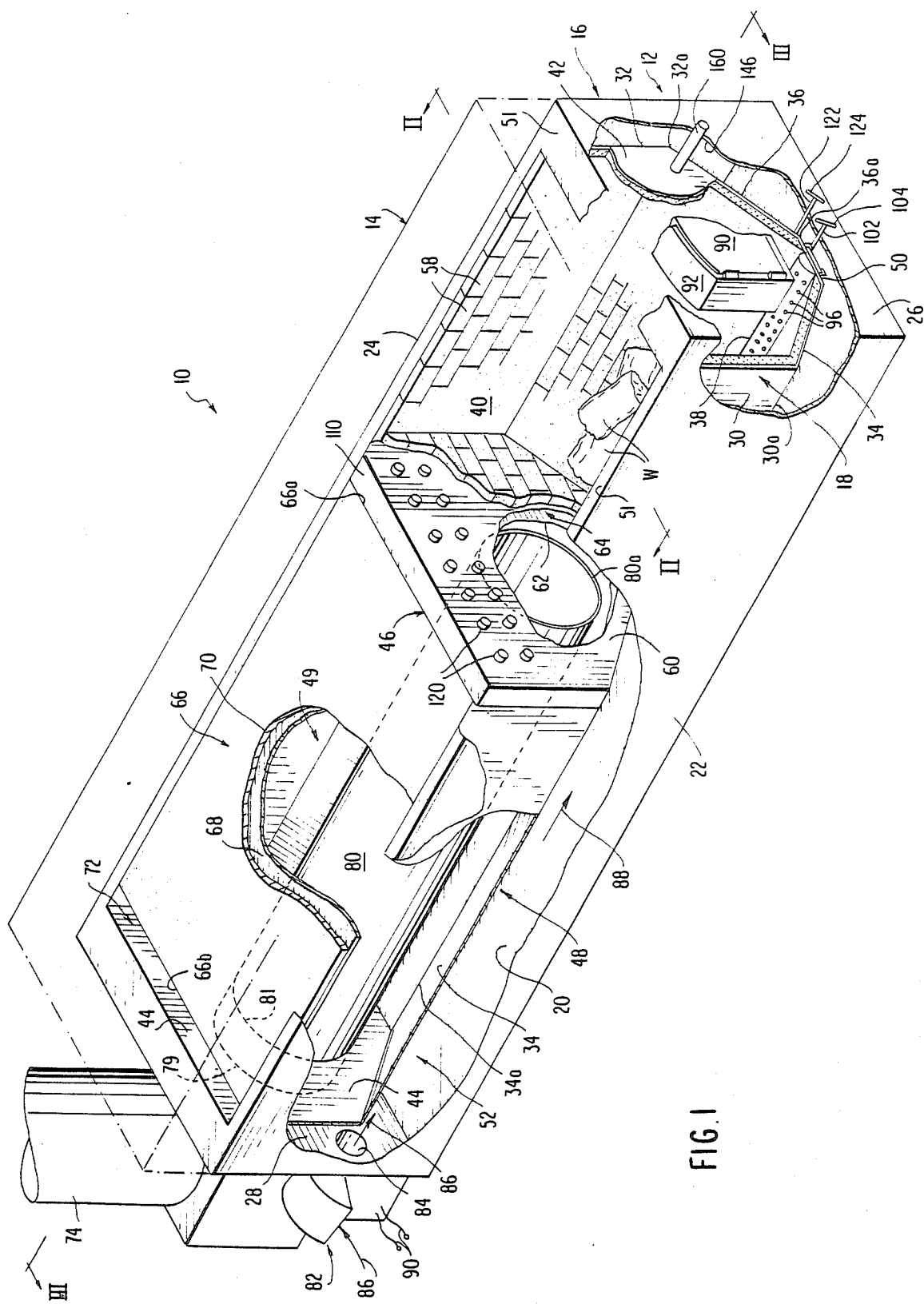
FIG. 1 is a perspective view, partially broken away, of a maple syrup vaporizer apparatus with hollow shell recirculation arch forming a preferred embodiment of the invention.
Figure 2:
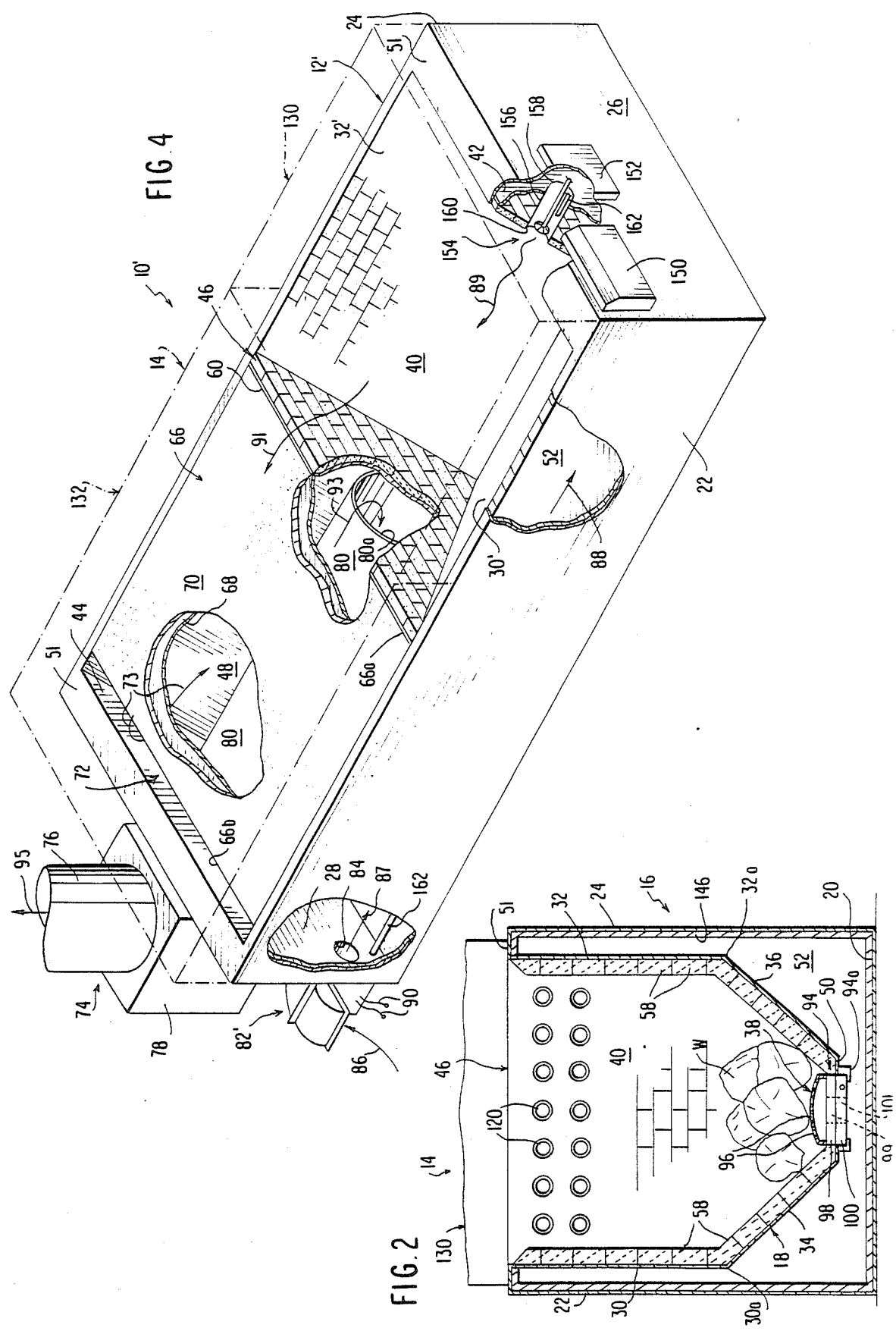
FIG. 2 is a vertical sectional view of the vaporizer apparatus of FIG. 1 taken about line II—II.
Figure 3:
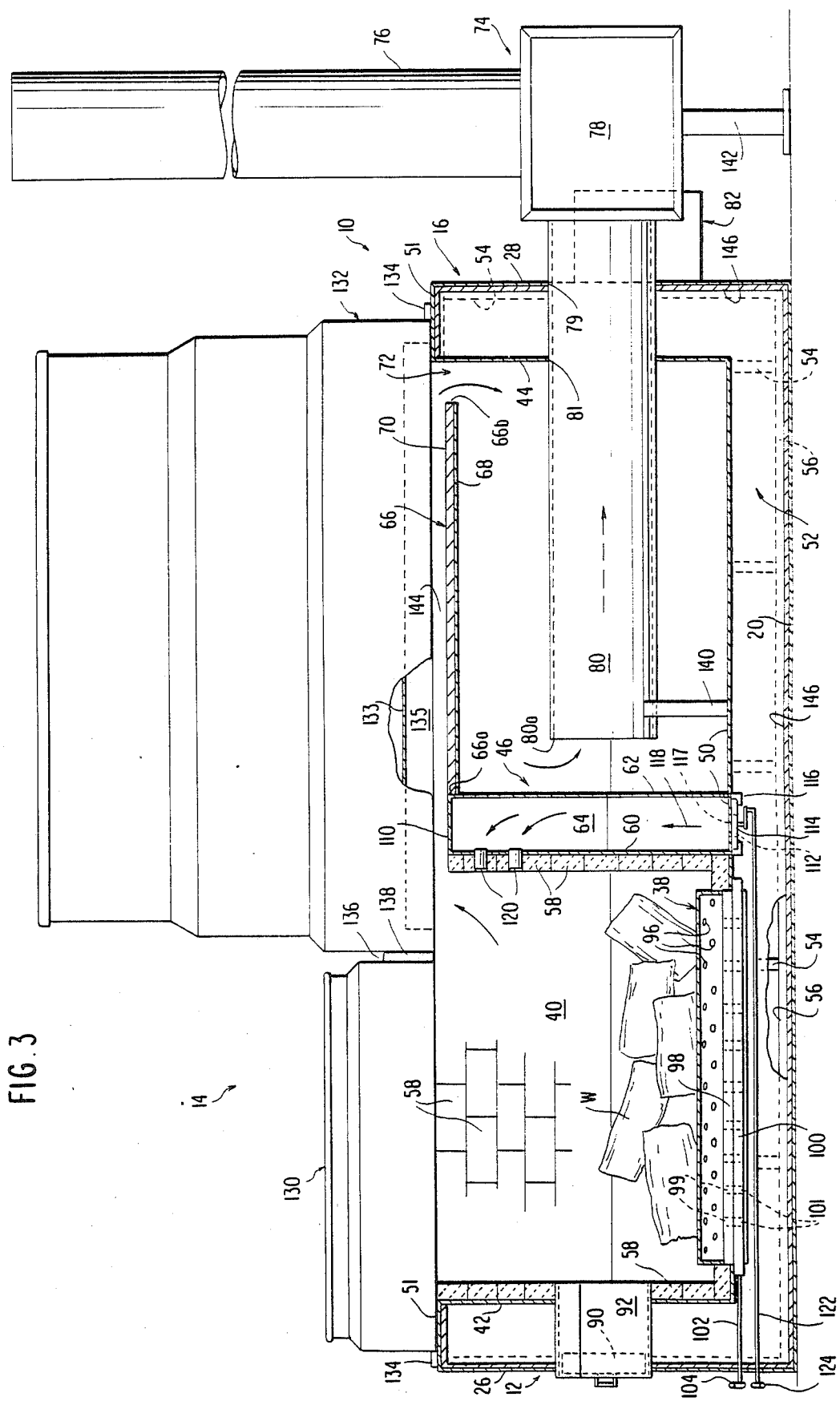
FIG. 3 is a longitudinal vertical sectional view of the apparatus of FIG. 2 taken about line III—III.

Referring first to FIGS. 1-3 inclusive, one embodiment of the maple syrup vaporizer apparatus with hollow shelled recirculation arch is indicated generally at 10. The vaporizer apparatus 10 comprises principally a wood fueled recirculation arch indicated generally at 12 and an overlying pan assembly indicated generally at 14. In FIG. 1, pan assembly 14 is shown in dotted lines to permit a better view of the contents of wood fired arch 12.

With respect to the wood fired arch 12, it consists principally of an outer metal shell 16 and an inner metal shell 18 which are spaced from each other and which are formed by open frame members covered with sheet metal to define various walls for shells 16, 18. In the various embodiments including that of FIGS. 1-3 inclusive, the outer shell is of parallelepiped form including a bottom wall 20, laterally opposed vertical sidewalls 22, 24 and longitudinally opposed front and rear walls 26, 28. respectively. Positioned internally of the outer shell 16, is inner shell 18 whose transverse cross section is of modified V-shape and formed by laterally opposed vertical sidewalls 30, 32 which extend downwardly from the top of the wood fueled arch 12 towards bottom wall 20 of the outer shell 16. Sidewalls 30, 32 are integrally connected along lower edges 30a, 32a to oblique sidewalls 34, 36 whose lower end edges 34a, 36a, in turn, are integrally connected to a bottom wall 50 and extending over the full length of the inner shell from inner shell front wall 42 to the inner shell rear wall 44. The inner shell front wall 42 is spaced some distance from the outer shell front wall 26. Likewise, the inner shell rear wall 44 is spaced some distance from the outer shell rear wall 28. The top of the inner shell is open so as to facilitate the heating of the overlying pan assembly 14 which is preferably sized to and physically mounted on the underlying wood fired arch 12.

A vertical, transverse bridge wall indicated generally at 46, is interposed longitudinally between front wall 42 and rear wall 44 of the inner shell 18 and divides the interior of the wood fired arch 12 into a fire box 40 at the front of the wood fired arch 12, and a regenerative heat exchanger 48 between the bridge wall 46 and the rear wall 44 of the wood fired arch inner shell 18. Inner shell 18 forms an inner heat exchange chamber 49. Within the regenerative heat exchanger 48, the bottom wall 50 of that section is also formed by the flat strip of sheet metal and a cast iron grate 38 extends above bottom wall 50, only over the length of the fire box 40. Further, the upper edges of outer sheet metal shell 16 and inner sheet metal shell 18 sidewalls and front and rear walls are integrally connected by a unitary top wall 51 which closes off the interior space between the two shells to define a first regenerative heat exchange chamber 52 therebetween.

The outer shell 16 can be formed of suitable heavy gauge hot rolled steel sheet material welded to appropriate metal angle arms as at 54, for opposite vertical sidewalls 22, 24, FIG. 2. welded to horizontal angle bars 56. Fire brick 58 lines the interior wall surfaces of the inner shell 18 fire box 40, and by extending over the front surface of front wall or panel 60 of bridge wall 46. Fire brick 58 lines the rear wall of the fire box 40, while fire brick 58 also lines the interior surface of the inner shell front wall 42, laterally opposed sidewalls 30, 32 of the inner shell and the interior surfaces of oblique sidewalls 34, 36. The fire brick 58 abuts opposite longitudinal sides of the cast iron grate 38 superposed on bottom wall 50 of the inner shell 18 over the major portion of the fire box 40.

The rear panel 62 of bridge wall 46 extends vertically parallel to front panel 60 of that member and is spaced therefrom by a distance of about 6 inches and forming an interior air distribution hollow chamber 64 which extends laterally the full width of the wood fired arch 12 and vertically over the full height of the outer shell 16. The fire brick 58 is of standard thickness, for instance 2½ inches, in the exemplary structure shown, in which the wood fired arch 12 is approximately 36 inches in lateral width and approximately 10 feet in length. There is provided a space of about 2 inches between sidewalls 30, 32 of the inner shell and vertical sidewalls 22, 24 of the outer sidewall, with that space enlarging at the bottom of the wood fired arch due to the oblique angulation of integral sidewalls 34, 36 of the inner shell 18. Since the function of chambers 49 and 52 is to facilitate heat exchange between the fresh air and the products of combustion prior to exhaustion through the stack or chimney of the vaporizer apparatus 10, it is necessary to cover the otherwise open top of the inner shell 18 to the side of the bridge wall 46 remote from the fire box 40. An insulated deck indicated generally at 66 is formed of a rectangular sheet metal plate 68 and an overlying panel of a high R factor thermoinsulation material 70. Further, it is important that the front edge 66a of insulated deck 66 abut the bridge wall 62, but that the rear edge 66b be spaced a short distance from rear wall 44 of the inner shell 18 to form a transverse gap or passage 72 permitting the products of combustion after contact with the bottom surface of the pan assembly 14 to enter the inner shell heat exchange chamber 49.

Insofar as the regenerative heat exchanger is concerned, a flue assembly or smoke stack assembly 74 is formed with a portion of a horizontal smoke intake pipe 80, interior of chamber 49. which is of a length slightly less than the distance between the inner shell rear wall 44 and rear wall 62 of the bridge wall 46. Thus, the front end 80a of the smoke stack assembly intake pipe 80 is spaced slightly away from the vertical rear panel 62 of bridge wall 46. All of the components with the exception of the fire brick and the insulation sheet 70 are formed of metal and may be welded together to effect a rigid structure and to seal off the various chambers and passages formed by these members.

In order to provide fresh combustion air to the fire box 40 via the regenerative heat exchanger 48, a motorized blower indicated generally at 82 is physically mounted to the exterior face of the outer shell rear wall 28 and the rear wall 28 is provided with a circular hole 84 through which fresh air, indicated generally by arrow 86, is drawn, via blower 82 and forced under some pressure into the chamber 52 between the inner and outer shells 16, 18. The fresh air passes in contact with the exterior surfaces of the inner shell 18, moving in a direction towards the front of the apparatus 10 as indicated by arrows 88. FIG. 1. Electrical power is supplied via paired leads 90 from a source (not shown) to the electric motor of blower 82. Both primary air and secondary air is supplied to the fire box 40 to facilitate burning of wood which wood W is introduced into fire box 40 through a front door 90, which is hinged to a door air collar 92. Collar 92 is welded to the front wall 26 of outer shell 16 and extends from that front wall through the front wall 42 of inner shell 18 thereby providing access to the interior of the fire box 40.

As best seen in FIGS. 2 and 3, a steel frame 94 extends along the length of bottom wall 50 of the inner shell 18 at fire box 40 which supports the cast iron wood saver grate 38. The grate 38 bears a series of holes 96 over the length of the same and which holes open to an underlying steel plate 98 having a series of longitudinally spaced, laterally directed slots 99. Plate 98 is fixed to the steel frame 94, and frame 94 includes L-shaped guides 94a to opposite sides, which point towards each other and which longitudinally support a sliding plate 100 for sliding movement in the longitudinal direction of the wood fired arch 12. Sliding plate 100 includes longitudinally spaced transverse slots 101. A first rod 102 is fixedly mounted at one end to the sliding plate 100 and has its opposite end projecting through the front wall 26 of outer shell 16. The rod 102 terminates in a handle 104 such that the sliding plate 100 may be shifted longitudinally with respect to the fixed plate 98 to align or misalign slots 99, 101 of respective plates. The transversely extending slots 99, 101 which may be aligned totally, misaligned or partially overlapped so as to control the volume of primary combustion air which passes through plates 100. 98 and through holes 96 of the perforated cast iron grate 38. Thus, fresh air moving in the direction of arrows 88 from the rear end towards the front end of the wood fired arch 12 within chamber 52 passes into the fire box 40 via perforations or holes 96 within the cast iron grate 38 forming the primary air for combustion of fuel within the fire box 40 indicated by arrows 108.

The bridge wall 46, in addition to being formed of longitudinally spaced vertical front and rear panels 60, 62, is closed off at the top by a top wall 110, along opposite sides by the sidewalls 30, 32, 34, 36 of the inner shell 18 and at the bottom by the unitary bottom wall 50 of the inner shell 18. Access to the interior of chamber 64 defined by the panels and the inner shell 18 is through an opening or hole 112 within the bottom wall 50 between vertical panels 60, 62 of bridge wall 46. A rotary steel plate 114 is mounted by suitable brackets or slides 116, FIG. 3, for rotation about its axis so as to completely close off or selectively vary the size of a passage to the interior of chamber 64 via opening 112 within bottom wall 50 at the bridge wall 46 and an opening 117 within plate 114. By rotationally shifting plate 114, some of the air flowing towards the front of the wood fired arch 12 within heat exchange chamber 52 enters the interior 64 of the bridge wall 46. This fresh air indicated by arrow 118, forms the secondary combustion air for burning of the wood within fire box 40. The air passes from chamber 64 into the fire box 40 through a series of secondary air nozzles 120, FIG. 1, which nozzles 120 may be short length metal pipes projecting through holes formed within front panel 60 and the fire bricks 58 lining the front vertical panel 60 of the bridge wall 46. A refractory material coats the nozzles 120 to protect them from the intense heat generated within the fire box 40 during burning of the solid, wood fuel.

In order to physically shift the plate 114, a second control rod 122 extends parallel to control rod 102, and is mounted for reciprocation longitudinally and fixed at one end 122a to the side of rotary plate 114, while its opposite end projects through front wall 26 of the outer shells 16 and terminates in a handle 124. Thus, the plate 114 may be rotated to vary the size of the flow path through openings 112, 117 within the plate 114 and bottom wall 50 into chamber 64, and from chamber 64 through the secondary air nozzles 120.

As shown in FIG. 3, directly overlying the fire box 40 is a syrup pan or thickening pan 130 spaced slightly from the end of an adjacent main vaporizing pan or crimp pan 132. The pans 130, 132 are sized to and physically mounted directly on top of the wood fired arch 12 and maintained in position by metal cross bars 134 which locate the positions of respective pans. There is a narrow spacing 136 between the ends of respective pans, within which space 136 is positioned a thermoinsulation blanket 138. In the illustrated embodiment of FIGS. 1-3 inclusive, the thickening pan 130 is of a length of approximately 3 feet, while that of the main vaporizing pan 132 is approximately 7 feet. Thus, only the very front portion of the main vaporizing pan 132 directly overlies open fire box 40. Conventionally, the bottom 133 of pan 132 may be convoluted or serrated to provide laterally spaced, longitudinal flow channels 135 for the hot combustion gases generated by burning of wood W within the fire box 40. This is particularly necessary in view of the presence of the insulated deck 66 which physically separates the chamber 49 defined by the inner shell 18 from the primary vaporizing pan 132. Further, since the rear edge 66b of the insulation deck 66 terminates short of the vertical rear wall 44 of the inner shell 18, the combustion gases escape from channels 135 beneath the main vaporizing pan 132 and enter chamber 48 housing the horizontal smoke stack pipe 80. The combustion gases enter open end 80a of the pipe 80 in the area 49a between bridge wall vertical panel 62 and the open end 80a of pipe 80. As seen in FIG. 3, the pipe 80 is supported by the aligned circular holes 79 and 81 within the outer shell rear wall 28 and the inner shell rear wall 44, respectively, while the pipe end 80a, most remote from the plenum 78, is physically supported by a vertical post 140. Further, exterior of the outer shell 16, plenum 78 is physically supported by an upright, T-stand 142 and the vertical smoke stack 76 extends vertically upwardly from the plenum 78.

If the bottom wall 133 of the main vaporizer pan 132 is not serrated, it is necessary to create a thin exhaust gas passage such as that shown at 144 between the insulation deck 66, the top surface 110 of the bridge wall 46, and the serrated bottom wall 133 of main vaporizing pan 132.

In order to prevent the escape of heat from chamber 52, the interior surfaces of the outer shell 16 are covered with a suitable coating of thermoinsulation material 146 so that heat from the exhaust gases radiated by the walls of the inner shell 18 readily preheats the incoming fresh air prior to entering fire box 40 through the secondary air jets or nozzles 120 or through the perforated cast iron grate 38 as primary air flow. Thus, the air which is preheated by the escaping heat as a result of the combustion process then passes down underneath the cast iron grate which occupies the front of the wood fired arch 12 with some portion of this air passing underneath the grate floor or bottom wall 50 of the inner shell 18 and coming up through opening 112 into the interior 64 of the bridge wall 46 for discharge as secondary air jets through nozzles 120. The products of combustion or flue gases having been completely and properly combusted upon burning of the wood W (or other solid fuel) rise underneath the syrup or thickening pan 130, pass over the top 110 of the bridge wall 46 and pass along through the flues 135 defined by the serrated bottom wall 133 of the main vaporizing pan 132, the flue gases also passing over the top of the insulated deck 66. The flue gases which reverse about the edge 66b of the insulated deck 66 pass through chamber 48 prior to escape through the smoke stack horizontal pipe 80, and function to readily transmit the majority of the heat therefrom to the incoming combustion air passing on the opposite side of the inner shell 18 and within the chamber 52 formed between shells 16, 18.

A peephole 160 may be provided by an appropriate pipe passing through front walls 26, 42 of respective outer and inner shells 16, 18 to permit viewing of combustion process internally of fire box 40.

In operation, chunks of firewood W are thrown into the fire box 40 through door 90 and the blower 82 is energized via leads 90 while maple tree sap is fed to the main vaporizing pan 132 (metered by conventional means). The flow of the combustion products or flue gases prior to escape through vertical smoke stack 76 of the smoke stack assembly 74 is as described, subject to regenerative heat exchange within the regenerative heat exchanger 48 to the rear of the wood fired arch 12. The invention is characterized by the introduction of fresh air for combustion into the rear of a hollow shell vaporizer arch 12 which facilitates the recovery of normally lost heat passing out of the smoke stack assembly 74 with the still hot products of combustion. Additionally, the V-shape or modified V-shape of the fire box 40 achieves excellent cross reflection of the heat generated by the burning of wood W within the fire box. The improved apparatus provides dampened mixing of both primary and secondary air within the fire box for facilitating the burning of solid fuel therein. The maple sap evaporator arch 12 facilitates the direct application of heat to the overlying pans 130, 132, while a very effective regenerative heat exchange takes place due to the placement of the intake end 80a of the horizontal smoke stack pipe 80 at the front end of the regenerative heat exchange chamber 48, just behind the bridge wall 46. This requires the products of combustion to double back twice prior to escaping from the rear end of the wood fired arch 12.

Referring next to FIGS. 4–7 inclusive, a second embodiment of the maple syrup vaporizer apparatus with shell recirculation arch is indicated generally at 10'. In this embodiment, as well as all of the embodiments, common elements have the same numerical designations. In this case, instead of the apparatus being fueled by wood or other solid fuel, it is fueled by oil. The apparatus 10' comprises a oil fueled recirculation arch indicated generally at 12' and incorporates an overlying pan assembly indicated generally at 14 which may be identical to that of the first embodiment. In FIG. 4, the pan assembly 14 is again shown in dotted lines to permit a better view of the content of the oil fired arch 12'. Arch 12' consists of an outer metal shell 16 and inner metal shell 18 which are spaced from each other and are formed again by open frame metal members covered with sheet to form the various walls for shells 16, 18. The outer is formed in parallelepiped form including a bottom wall 20, laterally opposed vertical sidewalls 22, 24 and longitudinally vertical, front and rear walls 26, 28, respectively. Positioned internally of the outer shell 16 is the inner shell 18. In this case, the inner shell is of nearly full V-shape being formed of laterally opposed oblique, oppositely diverging, sidewalls 30', 32' which extend downwardly and inwardly from the of the oil fueled arch 12' towards the bottom wall 20 of outer shell 16. The oblique sidewalls 30', 32' meet the bottom 20 of outer shell 16 and define with bottom wall 20 and laterally opposed sidewalls 22, 24 a confined outer, first heat exchange chamber 52. At least the inner surfaces of the outer sidewalls 22, 24, and front and rear walls 26, 28, respectively of outer shell 16 are covered with a thin layer of thermoinsulation material 146 identical to that of the first embodiment. The inner shell 18 is completed by a front wall 42 and a rear wall 44 which are spaced from outer shell front wall 26 and outer shell rear wall 28, respectively. The top of the inner shell 18 is open, however, a top wall 51 is interposed between the shells, particularly at the front and rear to seal off the heat exchange chamber 52 between the two shells. A transverse bridge wall 46 is provided within the inner shell 18 which is vertical and which is positioned intermediate between front wall 42 and rear wall 44 of the inner shell 18. Fire brick 58 lines the face of the bridge wall 46 front panel 60 which faces vertical front wall 42 of the inner shell 18, that front wall 42 and lateral, oblique sidewalls 30', 32' of the inner shell 18. The area defined by bridge wall 46, sidewalls 30', 32' and front wall 42 of the inner shell forms a fire box 40 for the oil fired arch 12'.

In similar fashion to the first embodiment, for both the inner and outer shells 16, 18, a suitable heavy gauge steel sheet material is welded to appropriate metal angle arms as at 54 for opposite vertical sidewalls 22, 24, for the outer shell 16 and integrated horizontal angle bars 46. Since there is no secondary air entering fire box 40, the bridge wall 46 may be constructed entirely of fire brick 48. Alternatively, the fire brick 58 may line the interior surface of vertical sheet metal panel 60, which panel 60 faces the rall 44 of the inner shell 18. The overall length and lateral width of the oil fired arch 12' may be 48 inches 12 feet, respectively, differing from the first embodiment. In similar fashion to the first embodiment, an inner regenerative heat exchanger chamber 48 has, interiorly of the inner shell 18 and longitudinally between bridge wall 46 and the rear wall 44 of shell 18, an inner, second heat exchange chamber 49. This chamber 49 is closed off at the top by insulated deck 66 formed by an underlying rectangular sheet metal plate and an overlying panel 70 of high R factor thermoinsulation material 70. Front edge 66a of deck 66 abuts the bridge wall 46 while the rear edge 66b is spaced a short distance from rear wall 44 of the inner shell 18 to provide the transverse gap or slot 72 such that the flue gases flowing along the bottom of the main vaporizing pan 132 and that of the thickening pan 130 as indicated by reverse arrow 73, FIG. 4, seek escape from the apparatus, through slot 72 to the smoke stack assembly indicated generally at 74.

The smoke stack assembly or flue assembly 74 is identical to that of the first embodiment. A horizontal smoke intake pipe 80 projects through circular holes sized thereto within vertical rear wall 52 of the outer shell and vertical rear wall 44 of the inner shell 18 and pipe 80 is of a length such that the open end 80a thereof, remote from plenum 78 is spaced several inches away from the bridge panel 60. Further in similar fashion to the first embodiment, a motorized blower indicated generally at 82 is physically mounted to the exterior face of the outer shell rear wall 28. Fresh air indicated generally by arrow 86 is drawn through the blower 82 and forced under some pressure through circular hub 84 into regenerative heat exchange chamber 52 between the inner and outer shell 16, 18. That air, as indicated by arrows 87, 88 passes in contact with the exterior surfaces of the inner shell 18 in moving towards the front of the apparatus 10, FIG. 4. Electrical power is supplied from a source (not shown) to paired leads 90 for the electrical motor blower 82 via a control panel 150. Only primary air is needed to facilitate, in this case, the burning of fuel oil within fire box 40. At the front of apparatus 10, there is mounted to outer shell front wall 26, both the electrical control panel 150 and a nozzle access panel indicated generally at 152.

In the partially broken away view of FIG. 4, an oil burner nozzle assembly indicated generally at 154 and includes a cylinder 156, which is physically mounted within paired cylindrical holes or openings 158, 160 of respective front walls 26, 42 of the inner and outer shells 18, 16, respectively. The oil burner nozzle assembly 154 is conventional in all respects. In this case, the blower assembly 82' comprises a combination blower and pump assembly since it introduces air into the hollow chamber 52 of the regenerative heat exchanger between the inner and outer shells 18, 16, respectively at the rear of the oil fired arch 12', while additionally introducing oil into a preheating pipe 162 which is situated inside the arch 12' near the bottom and outside of the V-shaped fire box or combustion chamber 40. Tube 156 receives the preheated fresh air which enters the horizontally positioned tube 156 where it mixes with the preheated fuel oil just ahead of the spiraling arrow 89 which action is typical of forced air oil fired furnaces. The preheated air is readily available to the vertical space defined by outer shell front wall 26 and inner shell front wall 42. The nozzle assembly 154 effects the metered mixing of preheated fuel with the preheated air and discharges a fuel/air mixture in spiral fashion as indicated by spiral arrow 89. Ignition means such as a spark ignition system connected to the electrical control panel 150 ignites the fuel/air mixture. The fuel and air is rapidly burned within the fire box 40 (combustion chamber) with the products of combustion (flue gases) exiting from fire box 40 via a thin vertical gap between the bottom of the overlying main vaporizing pan 132 and insulated deck 66 as evidenced by arrow 91, FIG. 4. The burning of the liquid fuel and air mixture within fire box 40 creates sufficient heat which is radiated by oblique side walls 30', 32' directly against the bottom of the bottom wall 132a of the main vaporizing pan 132, FIG. 2. As mentioned previously, preferably that bottom wall undulates transversely at 133 to form flow channels 135, FIG. 5, through which the flue gases pass to heat the maple sap within the interior of pan 132. Not all of the heat of the flue gases is extracted from the flue gas prior to exiting through smoke stack assembly 74. The regenerative heat exchange between the outgoing flue gases and the incoming fresh air is further seen by the second flow reversal of those gases as indicated by arrow 93. FIG. 4, after the flue gases pass reversely over the full length of heat exchange chamber 48 prior to entering the upstream open end 80a of the horizontal smoke stack pipe 80.

Additionally, with the inner vertical walls 22, 24 and bottom wall 20 of the outer shell 16 being thermally insulated, a vast amount of the waste heat is extracted within the regenerative heat exchanger 48 portion of the arch 12' prior to final discharge of the flue gases vertically from the vertical smoke stack 76 as indicated by arrow 95, FIG. 4. The sheet metal wall 60 to which fire brick 58 is applied in forming bridge wall 46, preferably terminates short of the top of the outer shell 16, and a series of flat bars 164 are welded at opposite ends to the inwardly and downwardly sloping sidewalls 30', 32' of inner shell 18 which form longitudinally spaced supports for the insulation deck sheet metal plate 68.

The electrical control panel 150 connects to the electrical source and supplies current to the blower pump assembly 82 and other electrical components associated with the oil burner nozzle assembly 154, including the ignition means. The nozzle access panel 152 may be suitably mounted by screws to front wall 26 of the outer shell 16 so that by its removal, direct access may be had to nozzle assembly 154. The combusted flue gases in passing up and over the bridge wall 46 pass across the insulated deck 66 in the manner previously described.

Turning next to the plan view of FIG. 6 and the side elevational view of a portion of the pan assembly of FIG. 7, it is seen that the main vaporizing pan or crimp pan 132 is defined by laterally spaced sidewalls 170, 172, longitudinally spaced front and rear walls 174. 176, respectively and bottom wall 133. Similarly, the thickening pan or syrup pan 132 is formed of laterally opposed side walls 178, 180, front and rear walls 182. 184, respectively and bottom wall 185. These pans 130, 132 are conventional and in that respect, pan 132 may include a vertical spacer 186 running the major length of the same and from front wall 174 towards the rear wall 176 thereof. The pan assembly 14 includes a make box 188 to one side thereof within which the maple sap is supplied such that feed of the maple sap is through pipes 190. 192 which emanate from the make box and whose ends open into the interior of the make box 188, through lateral sidewall 172 of pan 132. The tubes 190, 192 are of L-shaped configuration and have open ends terminating adjacent main vaporizing pan front wall 174. A high quantity of water is vaporized from the maple sap within the main vaporizing pan 132. A pair of tubes 194 open to the upstream end of pan 132 from opposite sides and feed into a pair of distribution boxes 196 mounted to opposite sides of the adjacent thickening pan 130. Boxes 196 are mounted to the lateral walls 178. 180 of the thickening pan 130 and holes are provided within those side walls leading to the interior of the thickening pan. A number of vertical partitions 198 provided within the pan 130, extend upwardly from the bottom 185 thereof and are fixed at one end to either a front wall or rear wall of that pan but terminate short of the opposite wall so as to define a serpentine circulation path for the syrup within thickening pan 130. Pan 130 and the collection end of pan 132 overly the fire box 40 where most of the heat resulting from burning of the liquid hydrocarbon fuel emanates and is concentrated and reflected by the V-shaped or near V-shaped walls of that chamber against the bottom 185 of pan 130 and that of pan 132. The removal of the thickened syrup from pan 130 is effected by conventional means and involves a drain pipe (not shown) coupled to a sidewall of the pan 130.

FIG. 7 shows the nature in which a ceramic blanket 138 of rigid sheet form may be supported inbetween pans 130. 132. In that respect, an appropriate framework consisting of several risers 201 having hooked upper ends 201a carried by pan 132. Risers 201 receive a horizontal rod 203, each rod 203 having an end 203a which projects beyond front wall 174 of main vaporizing pan 132. Rods 203 extend along the sidewalls 170. 172 of the main vaporizing pan 14. Suspended from rods 203 at ends 203a, are a pair of U-shaped clamps 207 via suspension wires 205, the clamps 207 embracing the upper end of the ceramic blanket 138 of panel form, so that the ceramic blanket 138 thermally isolates the front thickening pan 130 from the rear positioned main vaporizing pan 132, insofar as arch 12 is concerned.

It should be appreciated that the pan assembly 14 as shown in FIGS. 6 and 7 is exemplary of a dual pan assembly whose ability to render maple syrup from raw sugar maple tree sap is facilitated by the construction and operation of the oil fired arch 12' and additionally, that pan assembly 14 of the second embodiment and that of the first embodiment are identically constructed.

Figure 8:
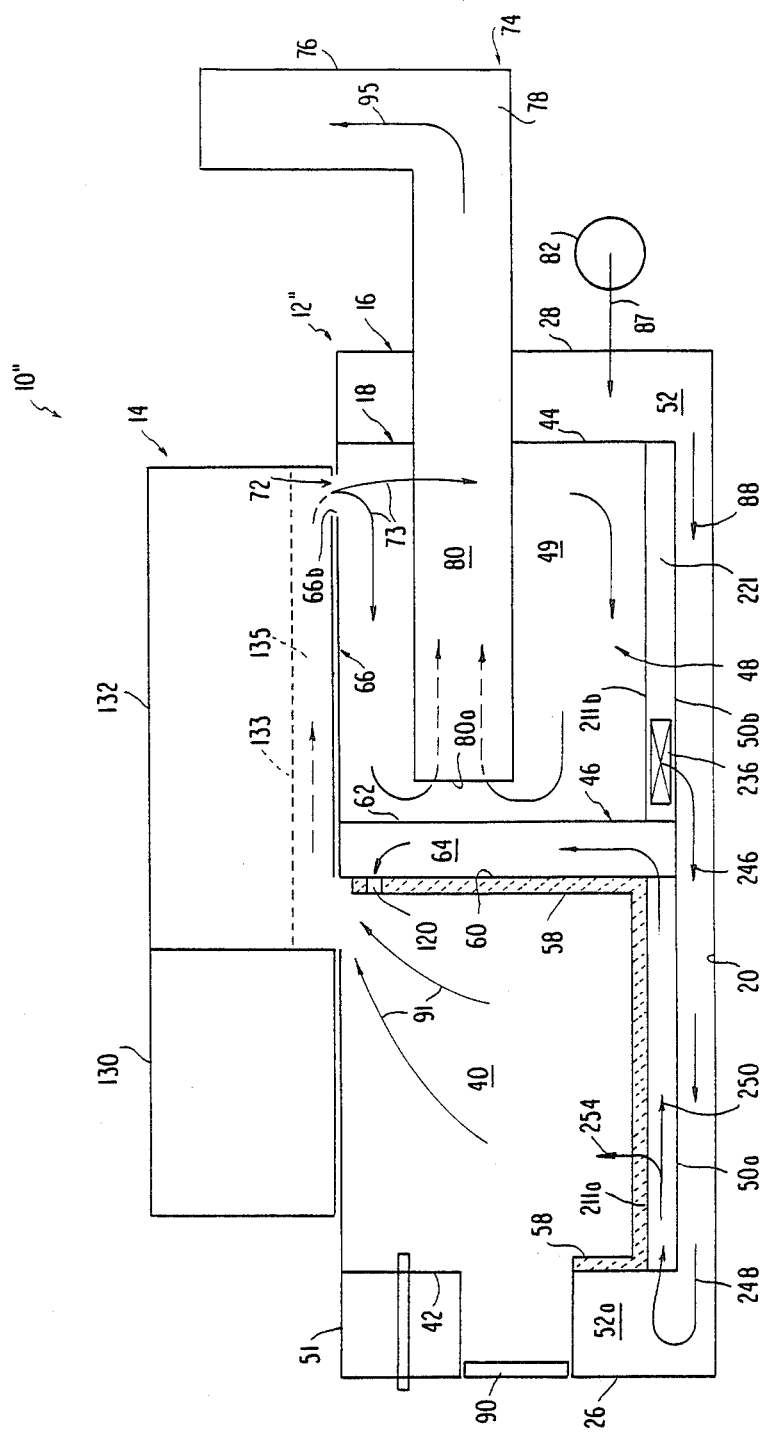
FIG. 8 is a schematic view of a further embodiment of the maple syrup vaporizing apparatus with hollow shelled arch, with the arch in parallelepiped form.
Figure 9:
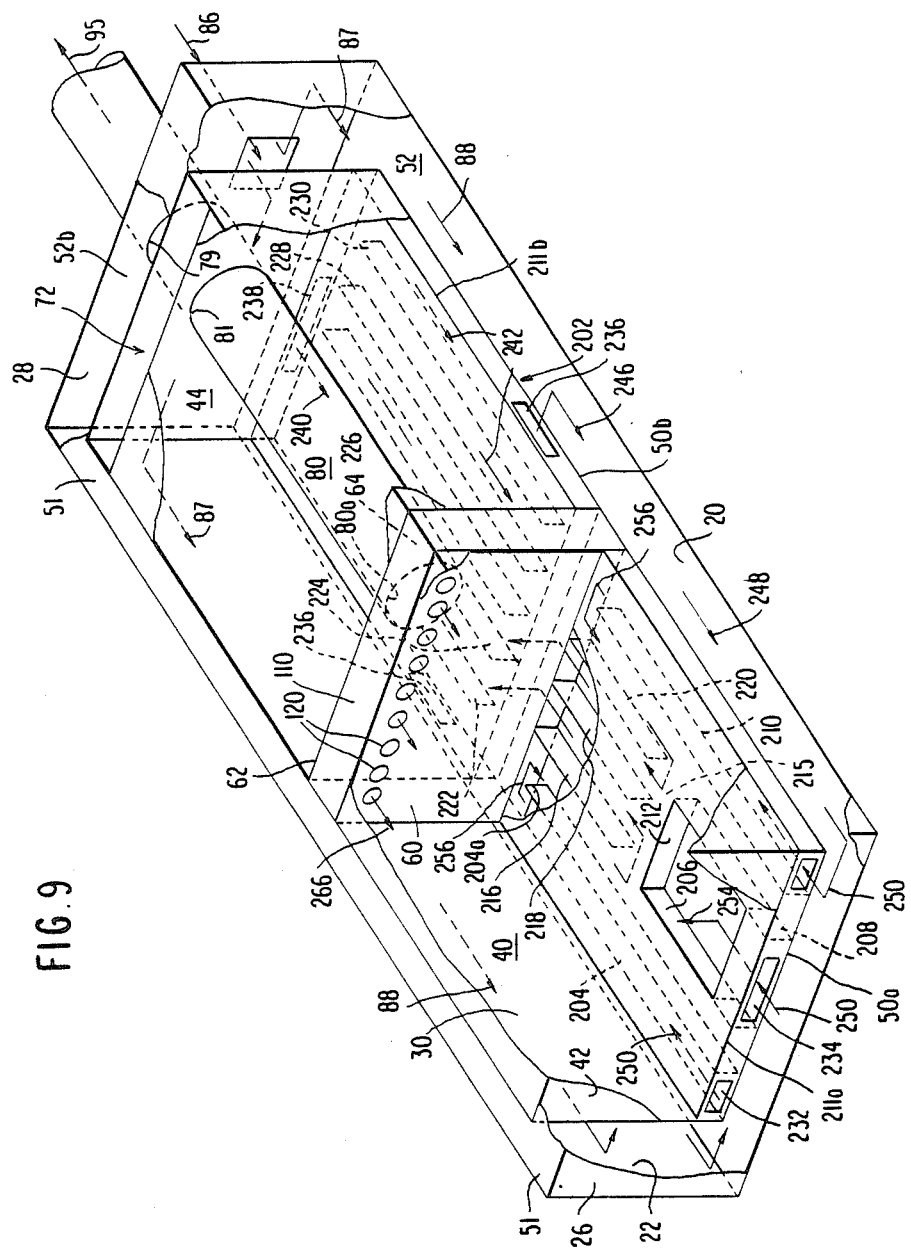
FIG. 9 is a schematic, perspective view of the wood fired recirculation arch portion of the maple syrup vaporizer apparatus of FIG. 8 illustrating the regenerative heat exchange between the escaping exhaust gases and the incoming combustion air.

Turning next to FIGS. 8 and 9, these FIGS. illustrate a further embodiment of the invention for a wood fired recirculation arch type maple syrup vaporizer apparatus 10" in which the hollow shell arch 12" is of parallelepiped form, both in terms of the outer shell and the inner shell. In this embodiment again, like elements to the prior embodiments employ like numeral designations. The two views are highly schematic but show fully the nature of the regenerative heat exchange between the incoming fresh air for combustion purposes and the flue gases exiting from the apparatus 10". The wood fired hollow shell recirculation arch of 12" is modified from that shown in the first embodiment. FIGS. 1-3 inclusive, although employing an outer shell 16 and inner shell 18 and being wood fired. Insofar as pan assembly 14 is concerned, the pan assembly 14 is identical to and reference may be had to both the previously described embodiments, particularly FIGS. 6 and 7, for a better understanding of that component of apparatus 10".

Briefly in this case both the inner shell 18 and outer shell 16 are of parallelepiped form. The outer shell 16 is formed by laterally opposed vertical sidewalls 22, 24, a horizontal bottom wall 20 and vertical front and rear walls 26, 28, respectively. The inner shell 18 is of matched configuration, but smaller size, including inner shell laterally spaced vertical sidewalls 30", 32", vertical front and rear walls 42', 44' of rectangular form and fore and aft bottom walls 50a, 50b completing that upwardly open structure. The bridge wall 46' similar to that of the first embodiment includes a front wall 60' spaced from a vertical rear wall 62' which walls 60', 62' are of rectangular form and partially defining a chamber 64 therebetween for receiving a portion of the fresh air for combustion and projecting it into the fire box 40 via secondary air jet nozzles schematically illustrated at 120. In similar fashion, fire brick 58 lines all the walls of the fire box 40 including a false bottom wall 211a for the inner shell 18, in front of the bridge wall 46' and a false bottom wall 211b for the regenerative heat exchanger or air preheat section 48 comprised of inner shell chamber 49 and the chamber 52 intermediate of the outer and inner shells 16 18.

In the schematic representations of FIGS. 8 and 9, it is seen that the products of combustion or flue gases discharged from the fire box as indicated by arrows 91, pass through the flow channels defined by the transverse convoluted bottom wall 133 of the crimp pan 132 to enter the inner shell regenerative heat exchange chamber 49 as indicated by double headed arrow 73, with the flow indicated in the embodiment of FIG. 4. As such, the flue gases flow across the top of insulation deck 66 and enter chamber 49 through the narrow transverse slot 72 about the rear edge 66b of the insulated deck 66.

The significance of the third embodiment in addition to the parallelepiped form of both the inner and outer shells 18, 16 is the nature in which the incoming fresh air flows over a folded path while extracting heat from the flue gases escaping through smoke stack assembly 74 by entering the front end 80a of the horizontal smoke stack pipe 80 prior to discharge from the vertical smoke stack 76 as indicated by arrow 95. FIGS. 8 and 9. In that respect, and particularly as seen from FIG. 8, there is a space between the bottom wall 20 of the outer shell 16 and the bottom wall sections 50a, 50b for fire box 40 and the regenerative heat exchanger 48 section of arch 12". This permits some of the incoming fresh air as indicated by arrow 87 from the supply air blower assembly 82 penetrating chamber 52 between the inner and outer shells 18. 16 to flow both alongside the exterior surfaces of the inner shell laterally spaced sidewalls 30", 32" and beneath the bottom wall sections 50a, 50b of the inner shell 18 to the area or space 52a between front wall 26 of the outer shell 16 and front wall 42 of the inner shell 18. In the embodiment of FIGS. 8 and 9, this partially preheated fresh air, is available to form both primary air and secondary air for combustion of the wood W or other solid fuel positioned within fire box 40 for burning through firing door 90, FIG. 8. In this embodiment the fire brick 58 lines false bottom 211a of the inner shell and the false bottom 211a is horizontal and parallels the bottom wall section 50a for fire box 40 between front wall 42 of that shell and the front wall or panel 60' of bridge wall 46 . A series of vertically upright metal floor stiffening plates are welded along top and bottom edges, respectively to false bottom wall 211a and bottom wall 50a of the inner shell 18 and form separator walls. In that respect, separator walls 204, 210 run almost the full length of false bottom wall 211a, separator walls 206, 208 extend from front wall 42 for some distance and are joined by a transverse spacer wall 212 to form a primary air plenum chamber 213. Behind plenum chamber 213, short length, parallel, vertical separator walls 216, 218 and 220 extend in the direction of the vertical front wall 60' of bridge wall 46'. These form a transverse or lateral air passage 215. Additionally, the near full length separator walls 204, 210 terminate short of the vertical panel 60' of the bridge wall 46. For purposes of causing preheated fresh air to enter the interior of the various channels defined by these separator walls, inlet ports 232 are formed within inner shell front wall 42, between lateral sidewall 30" and separator wall 204 and between lateral sidewall 32" and separator wall 210, such that preheated air flow enters passages defined thereby as indicated by arrows 250. The fresh air continues to receive heat from the surrounding environment as it reverses about vertical edges 204a and 210a for separator walls 210 and once again flow of this air is diverted 180° to enter channels between vertical separator walls 216, 218 and 218, 220. Openings 217, 219 are formed within the vertical front panel 60' of the bridge wall 46' such that extensively preheated fresh air enters chamber 64 for discharge through secondary jet nozzles 120 into the fire box 40 as secondary combustion air as per arrows 266.

Additionally, as may be appreciated best by reference to FIG. 9, a large portion of the incoming fresh air from the supply air blower assembly 82, in entering the space portion 52b between the outer shell rear wall 28 and the inner shell rear wall 44', enters inlet port 238 into a chamber defined by lateral sidewalls 30" and 32" of the inner shell 18, the false bottom wall section 211b and bottom wall section 50b of the regenerative heat exchanger portion of arch 12". This chamber 221 is provided with a plurality of vertical stiffener plates defining spaced separator walls 222, 224, 226, 228, 230 which run nearly the full length of chamber 231 to permit flow of air entering inlet port 238 to move in a sinusoidal path as indicated by arrows 242 from the center of chamber 221 towards the lateral sidewalls 30", 32" of the inner shell 18, where the preheated air exits through laterally opposed discharge ports 236, near the bridge wall 46' to enter and mix with preheated air passing between the laterally spaced sidewalls 22, 30" and 24, 32" in seeking fire box 40. The air is preheated by heat dissipated through the sidewalls and the false bottom of the heat exchanger chamber 48 and reaching the incoming fresh air within the portions of chamber 52 between the respective shells 16, 18.

As may be appreciated three different embodiments of the invention are set forth in the drawings and described in some detail within the specification. These embodiments are exemplary only and it should be obvious that features within respective embodiments may be incorporated within the other embodiments without departing from the scope of the invention. Additionally, the location of particular portions of the arches may vary, as well as the number of vaporizing pans and their location with respect to the fire box. The regenerative heat exchange sections of the arches may also be modified.

Further, while the invention has been particularly shown and described with reference to preferred embodiments thereof, it will be understood by those skilled in the art that various further changes and details may be made therein without departing from the spirit and scope of the invention.

What is claimed is:

1. A maple syrup vaporizer apparatus comprising a vaporizing pan assembly, a hollow shell recirculation arch underlying and supporting said vaporizing pan assembly and being sealably coupled thereto said hollow shell recirculation arch comprising an outer sheet metal shell including laterally spaced vertical sidewalls, longitudinally spaced vertical front and rear walls, and a bottom wall edge coupled at opposite ends to said front wall and rear wall, respectively and laterally edge coupled to respective lateral sidewalls, an inner shell upwardly open within said outer shell defined by at least laterally opposed sidewalls and a front wall and a rear wall at opposite ends thereof, said inner shell being sized such that at least over a portion of its width and length, it forms with said outer shell a first heat exchange chamber therebetween a bridge wall interposed within said inner shell, intermediate of said inner shell front wall and rear wall and forming, with said inner shell front wall a fire box, and with said rear wall of said inner shell, a second heat exchange chamber, said first and second heat exchange chamber defining a regenerative heat exchanger, an insulated deck extending horizontally over the major portion of the length of the second heat exchange chamber having a front edge sealed to said bridge wall and a rear edge spaced from the vertical rear wall of said inner shell, brickwork lining the interior surfaces of the fire box, the fire box being open at the top and directly facing the bottom of the pan assembly, and wherein means are provided within at least one of said hollow shell regeneration arch and said pan assembly for forming a horizontal passage from said fire box to the rear edge of the insulated deck for permitting products of combustion to flow from the fire box between the insulated deck and the bottom of the pan assembly and for entering the second regenerative heat exchange chamber by reverse flow about the rear edge of the insulated deck, and a smoke stack assembly including a horizontal smoke stack pipe fixedly mounted to the arch, projecting through the rear wall of the outer shell and the rear wall of the inner shell, and extending over the major length of the regenerative heat exchanger section of the arch and having an open end facing the bridge wall and spaced slightly therefrom, and means for forcing fresh combustion air into the first regenerative heat exchange chamber between the inner and outer shells for flowing the length of the arch, for preheating of the combustion air and means for discharging preheated combustion air as a primary air stream into the fire box for facilitating the combustion of fuel within the fire box in contact with the preheated fresh combustion air.

2. The apparatus as claimed in claim 1, wherein said inner shell is of generally V-shaped configuration including laterally opposed oblique sidewalls for concentrating and reflecting heat as a result of fuel combustion in the direction of the bottom of the pan assembly overlying the fire box.

3. The apparatus as claimed in claim 1, wherein a blower assembly is mounted to the rear wall of the outer shell and includes an air discharge port opening into the first heat exchange chamber between said inner and outer shells for forceably driving fresh combustion air throughout the length of the arch and in the direction of the fire box at the front of the apparatus.

4. The apparatus as claimed in 1, wherein said bridge wall comprises longitudinally spaced vertical panels partially defining a hollow chamber intermediate of said fire box and said regenerative heat exchanger wherein means are provided between said inner and outer shells for feeding a first portion of the fresh air passing through the regenerative heat exchanger to the hollow chamber within the bridge wall and for feeding a second portion of the fresh air passing through the heat exchanger into the fire box along the length of the fire box as primary combustion air, and at least one nozzle carried by said front panel of the bridge wall and opening into the fire box for discharging said first portion of preheated fresh air as secondary air into the combustion chamber to further facilitate combustion of the solid fuel within the fire box.

5. The apparatus as claimed in claim 1 wherein said smoke stack assembly comprises a plenum mounted outside of the outer shell, the horizontal smoke stack pipe has one end thereof projecting exteriorly of the outer shell rear wall and opening into said plenum, and wherein said plenum fixedly mounts a vertically upright smoke stack with the lower end of the vertically upright smoke stack opening directly into the plenum.

6. The apparatus as claimed in claim 1, wherein said inner shell comprises a narrow, bottom wall extending over at least the length of the fire box, said bottom wall comprising an elongated fixed metal plate including a plurality of transversely extending longitudinally spaced slots, a cast iron grate overlying said elongated fixed plate, said cast iron grate including holes passing therethrough, an elongated metal sliding plate means for mounting said sliding plate beneath said elongated fixed metal plate for longitudinal sliding movement, said sliding plate including a series of transversely extending, longitudinally spaced slots complimentary to the slots within the fixed plate. and means for longitudinally shifting said sliding plate with respect to said fixed plate and wherein said sliding plate is open to said first heat exchange chamber such that a primary air stream passes through overlapped slots of said sliding plate and said fixed plate and through the holes within the cast iron grate into the plenum chamber for supporting combustion of solid fuel within the fire box as primary combustion air.

7. The apparatus as claimed in claim 6 wherein a rod is fixedly mounted at one end to said sliding plate, extends horizontally in line therewith and has a second end projecting through the vertical front walls of said inner and outer shells and said second end terminates in a handle exterior of said outer shell such that pushing or pulling of the handle results in axial displacement of the slider plate to selectively control the volume of preheated primary air entering the fire box.

8. The apparatus as claimed in claim 6 wherein said bottom wall of said inner shell extends at least through the bridge wall, a hole is provided within said bottom wall opening to the interior of the hollow bridge wall, a secondary air control plate is rotatably mounted in juxtaposition to said hole within said bottom wall at said bridge wall and has an opening therein selectively aligned with said bridge wall bottom hole, and means are provided for rotating said secondary air control plate so as to variably close off said hole for varying the volume of secondary air flowing through said bridge wall hollow chamber and said at least one secondary air nozzle into the fire box for supporting combustion of solid fuel therein.

9. The apparatus as claimed in claim 1, wherein said insulated deck comprises a sheet metal plate nearly closing off the open first top of the inner shell and extending from the bridge wall towards the rear vertical wall of the arch but stopping short thereof, and a mineral wall insulation board positioned on the top of the steel plate sized to insulated deck sheet metal plate and facing the bottom of the pan assembly.

10. The apparatus as claimed in claim 1, wherein the pan assembly comprises a crimp pan overlying at least partially, the regenerative heat exchanger facing the insulated deck, and a syrup pan in longitudinal alignment therewith, with said syrup pan extending across the open top of the fire box and with the bottom of the syrup pan directly facing the interior of the fire box.

11. The apparatus as claimed in claim 10, further comprising a thermoinsulation panel interposed vertically between facing ends of crimp pan and syrup pan defining the pan assembly.

12. The apparatus as claimed in claim 1, wherein the inner surfaces of at least the longitudinally opposed front and rear walls, and the laterally opposed sidewalls of the outer shell are covered with thermal insulation material to significantly restrict heat loss through the laterally opposed sidewalls and the front and rear walls of the outer shell.

* * * * *